(12) United States Patent
Ishige

(10) Patent No.: US 7,321,391 B2
(45) Date of Patent: Jan. 22, 2008

(54) CAMERA APPARATUS, PHOTOGRAPHING METHOD AND A STORAGE MEDIUM THAT RECORDS METHOD OF PHOTOGRAPHING

(75) Inventor: Yoshiki Ishige, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 985 days.

(21) Appl. No.: 10/612,036

(22) Filed: Jul. 1, 2003

(65) Prior Publication Data
US 2004/0012702 A1    Jan. 22, 2004

(30) Foreign Application Priority Data
Jul. 8, 2002    (JP) .............................. 2002-198771

(51) Int. Cl.
*H04N 5/262*  (2006.01)
*H04N 5/225*  (2006.01)
*H04N 5/228*  (2006.01)

(52) U.S. Cl. ................. 348/239; 348/218.1; 348/222.1
(58) Field of Classification Search ................ 348/239, 348/218.1, 222.1
See application file for complete search history.

(56) References Cited

U.S. PATENT DOCUMENTS 5,107,334 A * 4/1992 Matsumoto ................. 348/561
5,617,138 A * 4/1997 Ito et al. .................... 348/222.1
6,122,004 A * 9/2000 Hwang ..................... 348/208.13
7,154,544 B2 * 12/2006 Kowno et al. ......... 348/240.99

FOREIGN PATENT DOCUMENTS

| EP | 0 942 598 A2 | 9/1999 |
|----|--------------|--------|
| JP | 1-302969 A | 12/1989 |
| JP | 05-145810 | 6/1993 |
| JP | 2000-287127 | 10/2000 |
| JP | 2002-131824 A | 5/2002 |
| WO | WO 98/25402 | 6/1998 |

* cited by examiner

*Primary Examiner*—James M. Hannett
(74) *Attorney, Agent, or Firm*—Frishauf, Holtz, Goodman & Chick, P.C.

(57) ABSTRACT

A camera has a provisional photographing mode in which a human model image is displayed on a through image in an overlapping manner on a display, and the user moves the human model image to a desired position in the through image and records a composition indicating image representing the conditions of the through image with the human model image at the desired position. After the provisional photographing process, the through image is synthesized with the recorded composition indicating image in a semi transparent manner, to display a synthesized image in place of the through image on the display. When a shutter is operated, a normal photographing process is performed to record an image.

10 Claims, 11 Drawing Sheets

FIG.6
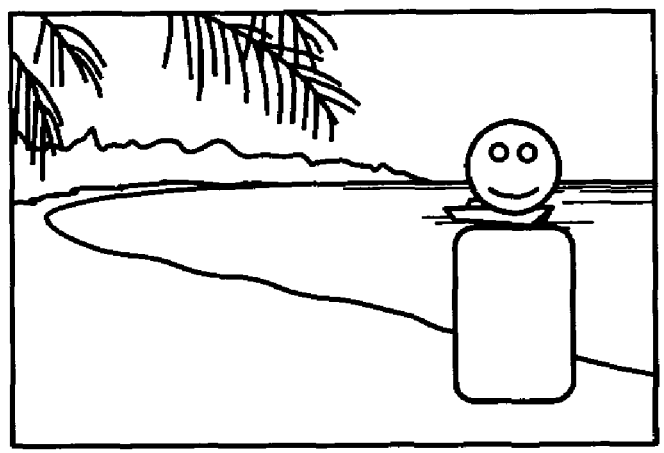
MODIFY
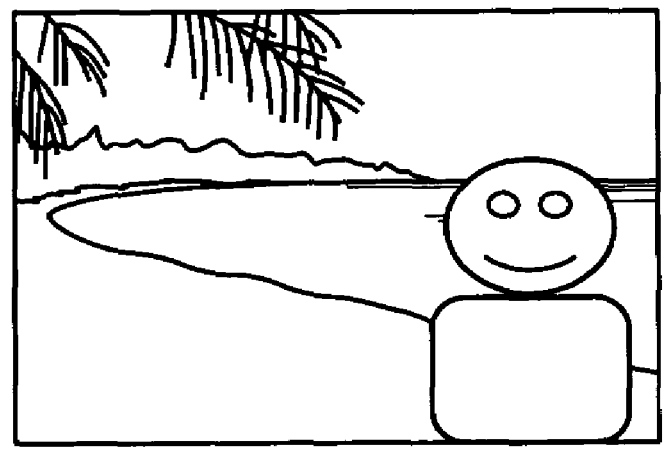

FIG.10
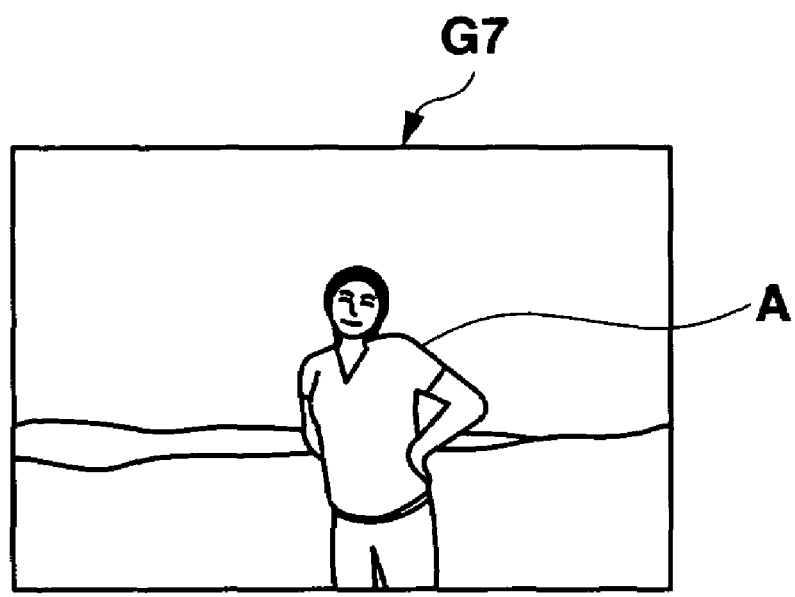
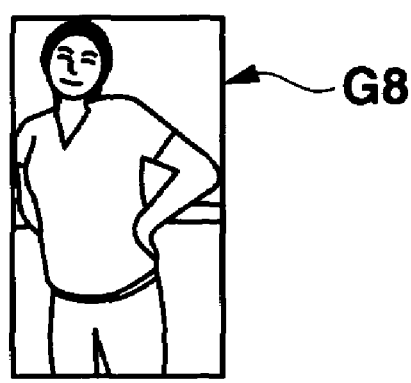

CAMERA APPARATUS, PHOTOGRAPHING METHOD AND A STORAGE MEDIUM THAT RECORDS METHOD OF PHOTOGRAPHING

CROSS-REFERENCE TO RELATED APPLICATIONS

This application is based upon and claims the benefit of priority from the prior Japanese Patent Application No. 2002-198771, filed Jul. 8, 2002, the entire contents of which are incorporated herein by reference.

BACKGROUND OF THE INVENTION

1. Field of the Invention

The present invention relates to a camera apparatus and a photographing method used for a digital camera in which an image of an subject is stored as image data.

2. Description of the Related Art

In general, a digital still camera (a digital camera), in which image data of a subject is stored in various recording media, is widely used at various occasions in daily life, because it is easy to use and users can take a fine picture, whether he or she is an expert photographer or not, thanks to its various convenient functions, such as Auto Focus (AF), Auto Exposure (AE), Automatic White Balance (AWB), and automatic setting control function for automatically setting proper shutter speed, focus, and white balance according to the scenes to be photographed. The digital camera is provided with unique features that can not be enjoyed with a conventional silver film camera, such as displaying a through image and a recorded image on its liquid crystal display, and it is expected that the digital camera will be provided with further additional functions based on its essential features.

Though the digital camera has been greatly improved in its usability and has the advanced features set forth above, the digital camera still involves problems with respect to the essential feature of "taking a picture", as set forth below.

That is, when the user wants take a picture of him or her at a sightseeing spot, a theme park, and/or amusement grounds, and does not carry a tripod, he or she has to ask his or her friend or other person to take a picture of him or her. But due to differences in a sense and/or a technique of taking a picture between the user and the person who is asked to take a picture, it is often caused that picture which are intended or expected by the user are not obtained. In other words, the digital camera has been improved in usability or feature, but still involves inconvenience inherent in the conventional silver film camera has not been solved with respect to the digital camera.

BRIEF SUMMARY OF THE INVENTION

Camera apparatus and a method of taking a picture are provided, dissolving inconvenience which a user of the camera will meet when taking a picture of him or her.

The camera apparatus according to the present invention comprises a photographing section for taking a picture of a subject to obtain an image, a display section for displaying the image obtained by the photographing section in a standby state, a storing section for storing the above image in response to photographing operation, an image synthesizing section for synthesizing an image representing composition of the image obtained by the photographing section and an position specifying image representing a predetermined position to obtain a synthesized image, a composition data storing section for storing composition data relating to a composition indicating image in which the position specifying image takes a position in the synthesized image, which position is desired by a user, and a display control section for successively synthesizing, in recognition by a photographer in a standby state in a photographing mode, the image obtained by the photographing section with composition indicating image based on the composition data stored in the composition data storing section to make a synthesized image, and for displaying on the display section the synthesized image as an image to be obtained.

BRIEF DESCRIPTION OF THE SEVERAL VIEWS OF THE DRAWING

The following description of preferred embodiments of the present invention will be better understood when read in conjunction with the appended drawings. It should be understood, however, that the invention is not limited to the precise arrangements shown in which:

FIG. 6 is a view illustrating a sample of a modified human model image;

FIG. 10 is a view illustrating procedures for the process of creating a human model image.

DETAILED DESCRIPTION OF THE INVENTION

Now, an embodiment of the present invention will be described in detail with reference to the accompanying drawings.

Figure 1:
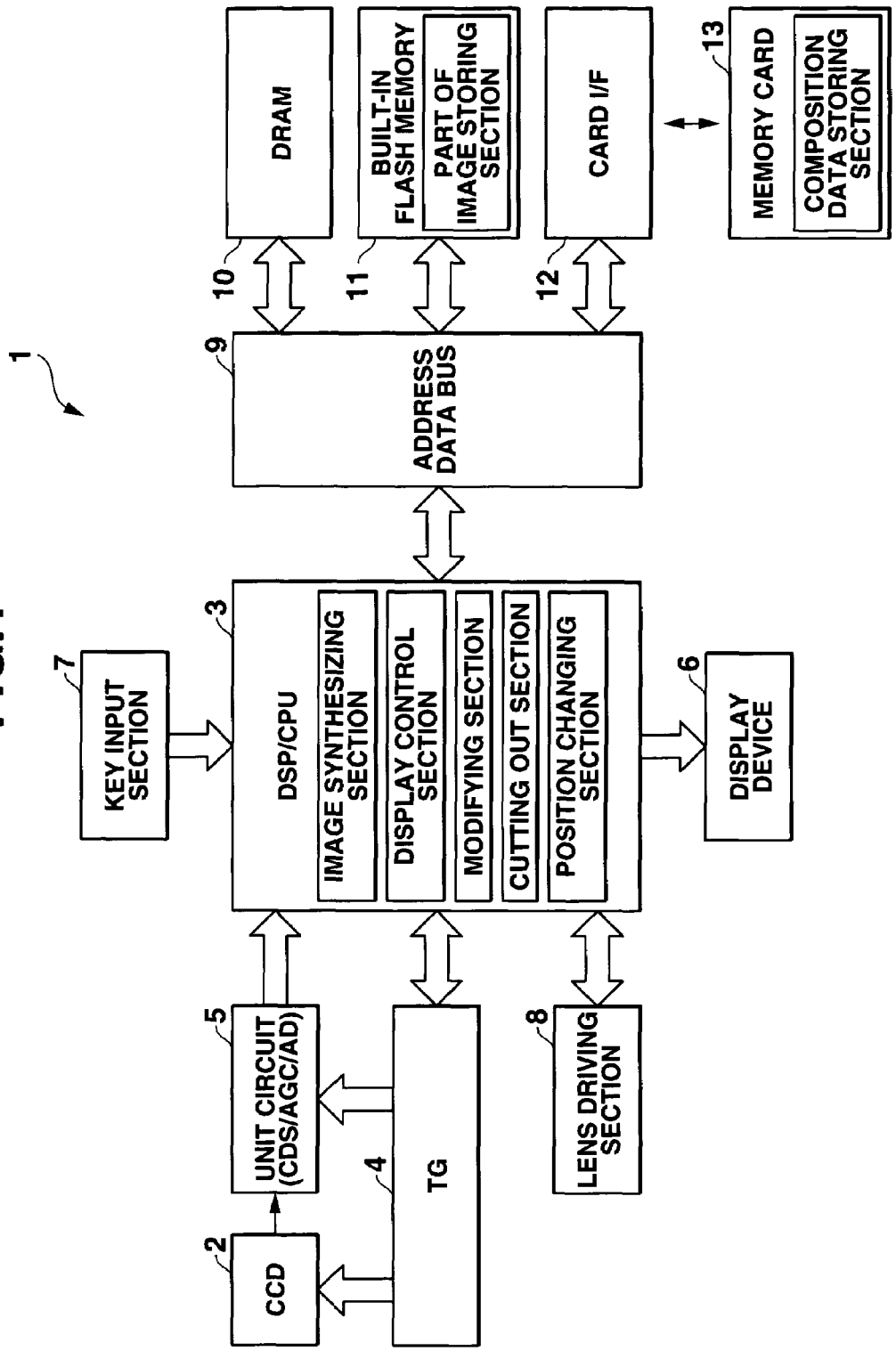
FIG. 1 is a block diagram of a digital camera according to an embodiment of the invention.

FIG. 1 is a block diagram showing an electric configuration of a digital camera 1 or a camera apparatus according to the present invention. The digital camera 1 has conventional functions such as AF, AE, and AWB and is further provided with a photographing section including CCD 2 and DSP/CPU 3. The CCD 2 serves to convert an optical image of a subject that is focused thereon through a focus lens and zoom lens (not shown) into an analog image signal and to output the thus converted analog image signal of the subject. The DSP/CPU 3 comprises one chip micro-computer that has a function of processing a digital signal including a data compression and expansion functions, and that controls various sections of the digital camera 1.

The DSP/CPU 3 is connected with a timing signal generator (TG) 4 for driving the CCD 2. The TG 4 is connected to a unit circuit 5 to which receives the image signal output from the CCD 2. The unit circuit 5 includes a Correlated Double Sampling circuit (CDS) for sampling and suppressing noises involved in an image signal output from the CCD 2, an automatic gain control amplifier (AGC) for amplifying the image signal processed in the CDS, and an A-D converter (AD) for converting the amplified image signal into a digital signal. The signal output from the CCD 2 is converted into the digital signal in the unit circuit 5 and the digital signal sent to the DSP/CPU 3.

The DSP/CPU 3 is connected with a display device 6, a key input section 7, a lens driving section 8, and further connected with DRAM 10, a built-in flash memory 11, and a card interface 12 through an address data bus 9. The card interface 12 is connected with a memory card 13 which is detachably received in a card slot of a camera body (not shown). The lens driving section 8 comprises a stepping motor for driving the focus lens and the zoom lens in the optical-axis direction, and a motor driver driven by a control signal supplied from the DSP/CPU 3.

The DRAM 10 is a buffer memory for temporarily storing the digital data of the image of the subject captured by the CCD 2 in a standby state for photographing, and the image data temporarily stored in the DRAM 10 is compressed and finally recorded in the memory card 13 (a recording section, a construction data recording section). Further, in a memory area of the DRAM 10 is previously prepared a work area used as a working area for the DSP/CPU 3. In the built-in flash memory 11 are stored an operation program for the DSP/CPU 3 and various data used for controlling various sections in the DSP/CPU 3. The various data include image data and a partial image of a human model image or a position specifying image of the invention as will be described, and the built-in flash memory serves as a partial image recording section for storing these data. The operation program for the DSP/CPU 3 may be stored in a memory or ROM which is separately prepared exclusively for storing the operation program.

The DSP/CPU 3 operates in accordance with the operation program. When taking a picture, the DSP/CPU 3 drives the driving motor in the lens driving section 8 to control the position of the focus lens (AF control), controls a charge storage time of the CCD 2 (a shutter speed), and controls gain of the automatic gain control amplifier (AGC) (AE control). In a pre photograph mode, the DSP/CPU 3 serves as an image synthesizing section, a display control section, a position adjusting section, a modifying section, and a cutout section, as will be described below.

The display device 6 is a display section of the invention, and includes a color liquid crystal display (a color LCD) and its driving circuit. The display device 6 displays a through image of the subject captured by the CCD 2 in a photograph standby mode (a standby mode), and displays a recorded image read out and expanded from the memory card 13 in a reproducing mode.

The key input section 7 comprises plural operation keys such as a shutter key, a power key, a mode selecting key, and a direction/decision key, and outputs a key input signal in response to operation by the user.

Figure 2:
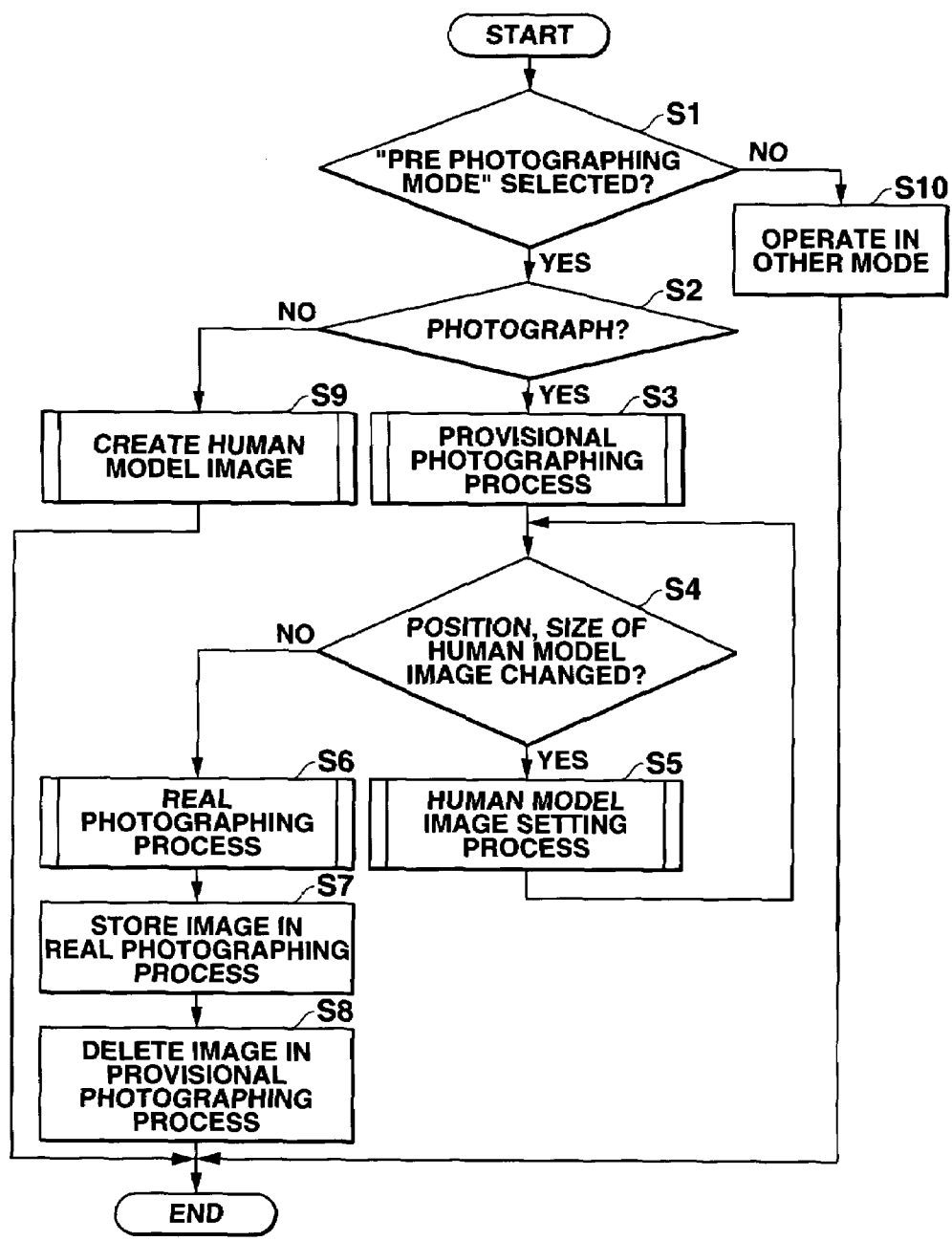
FIG. 2 is a flow chart of operation performed in the digital camera.

Operation of the digital camera 1 with the above configuration will be described with reference to the flow chart of the procedure performed by the DSP/CPU 3, as shown in FIG. 2. The description will be made based on an assumption that the user has asked his or her friend or other to take a picture of him or her at the theme park, and sightseeing spot or amusement parks.

The DSP/CPU 3 starts its operation at the time when the power is turned on, and judges at Step S1 whether the pre-photographing mode has been selected. The photograph mode is one of plural photograph modes prepared for the digital camera 1. When it is determined at Step S1 that the pre photograph mode has not selected (Step S1, NO), then the DSP/CPU 3 operates in the photograph mode other than the pre photograph mode at Step S10. Meanwhile, when the user has selected the pre photograph mode (Step S1, YES), the DSP/CPU 3 asks the user, for example, by displaying a message on the display device 6 to select either of indications such as "PHOTOGRAPH" and "CREATE HUMAN MODEL". When the user selects the "PHOTOGRAPH" by manipulating the key (Step S2, YES), a provisional photographing process is performed At Step S3.

Figure 3:
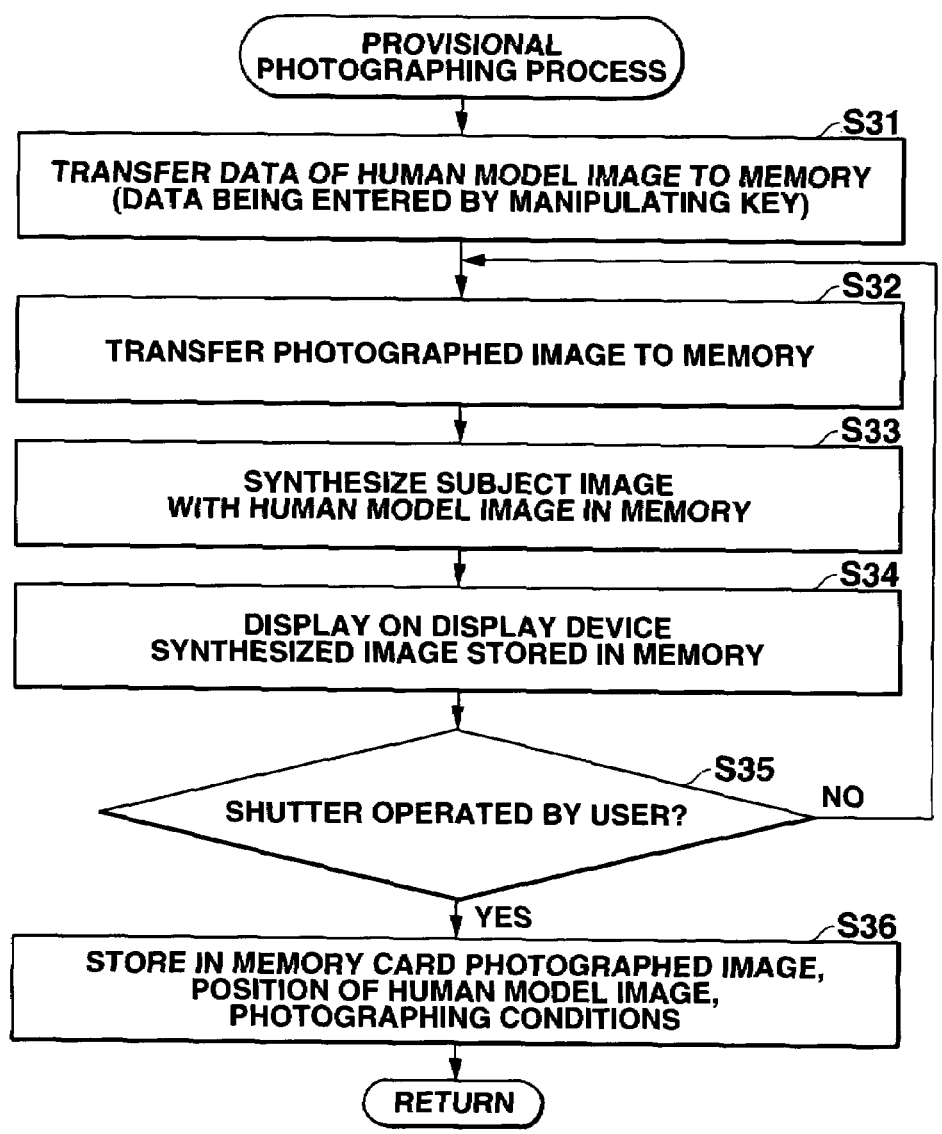
FIG. 3 is a flow chart showing procedures for a provisional photographing process.
Figure 4:
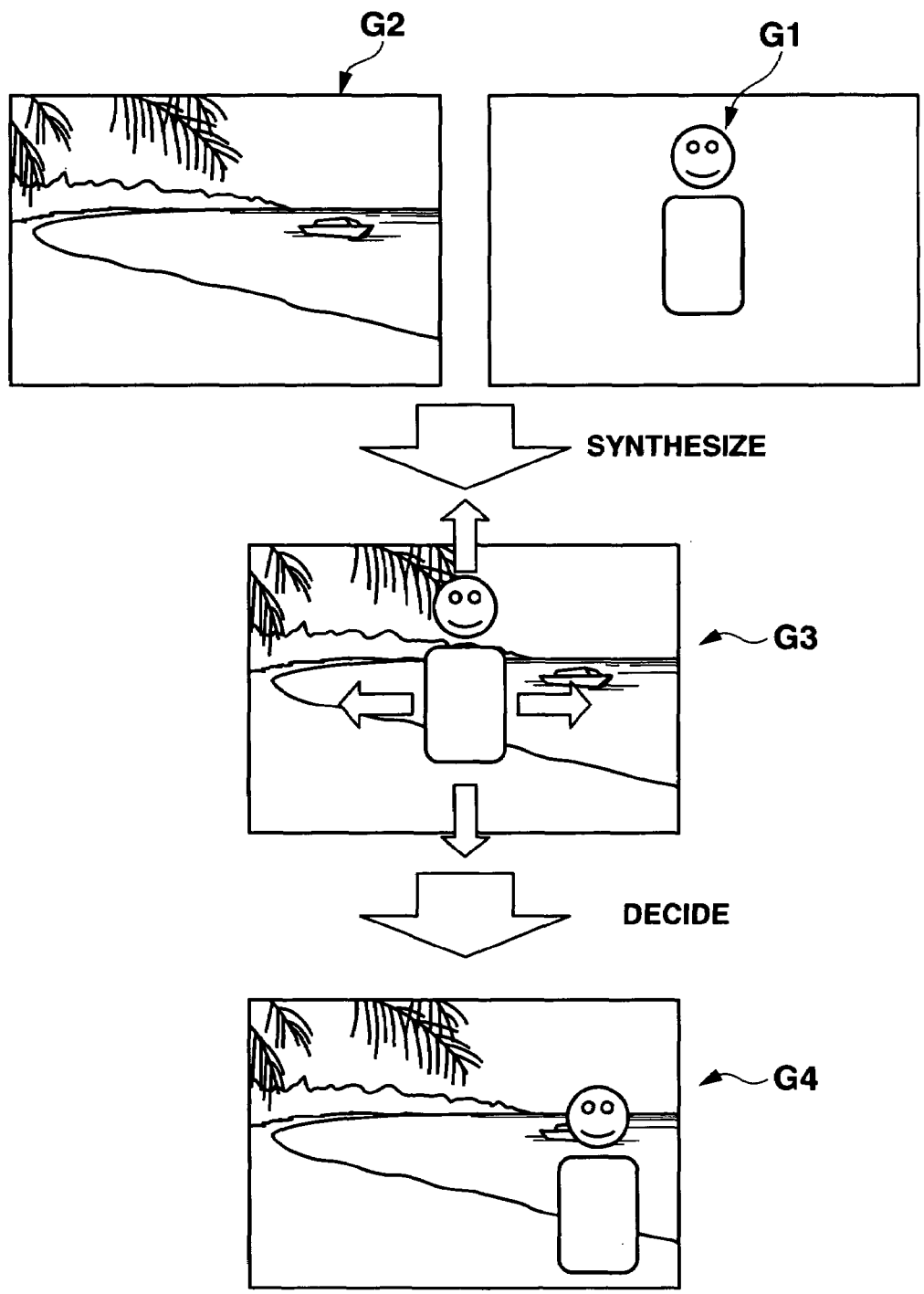
FIG. 4 is a view illustrating procedures for the provisional photographing process.

FIG. 3 is a flow chart showing procedures for the provisional photographing process, and FIG. 4 is a view illustrating procedures for the provisional photographing process. In the provisional photographing process shown in FIG. 3, image data of a human model image G1 stored in the built-in flash memory 11 is transferred to the work area of the DRAM 10 for expansion at Step S31. When plural image data of a human model image are stored in the built-in flash memory 11, these image data of a human model image are displayed on the display device 6 for selection by the user, and the image data selected by the user is transferred to the work area of the DRAM 10.

An image (an optical image) of the subject optically transformed by the CCD 2 is converted to a digital image signal in the unit circuit 5. The converted digital image signal (the image data of the subject), i.e. data of the subject image G2 (refer to FIG. 4), which is to be displayed as a through image in a standby state in the normal photograph mode is transferred to the DRAM 10 at Step S32. Then at Step S33, the human model image G1 is synthesized with the transferred subject image G2, and the synthesized image G3 is displayed on the display device 6 at Step S34. The processes at Step 32 through Step 34 are repeatedly performed until the user manipulates the shutter key at Step S35. When the user operates the direction key while these processes are performed, the human model image G1 moves in the subject image G2 in response to user's operation of the direction key. (omitted in FIG. 3)

At first, the user decides composition of a scene to be photographed by framing the scene displayed on the display device 6, and then moves the human model image G1 in the decided scene by operating the key. Then, the user operates the shutter key with the scene including the human model image displayed on the display device 6. (provisional photographing process or pre operation).

On the other hand, when the shutter key of the digital camera 1 is operated at Step S35 (YES), data concerning the photographed scene (the subject image G2) and the position of the human model image in the photographed scene are stored in the memory card 13 at Step S36, that is, (1) composition data concerning a composition indicating image G4 (shown in FIG. 4) including the subject image G2 synthesized with the human model image G1 arranged in the subject image G2 at the position determined by the user, and (2) conditions for taking a picture, for instance, setting data such as a shutter speed, and an aperture scale are stored in the memory card 13. When these data have been stored in the memory card 13 at Step S36, the provisional photographing process terminates, and the DSP/CPU 3 returns to the operation of FIG. 2. In the above description, the data are stored in the memory card 13 but the data may be stored in the DRAM 10.

A message is displayed on the display device 6 for determining if any modification to the position and/or size of the human model image G1 is required, and it is confirmed at Step S4, if such modification is required. When the user determines to make such modification at Step S4 (YES), a human model image setting process is performed at Step S5.

Figure 5:
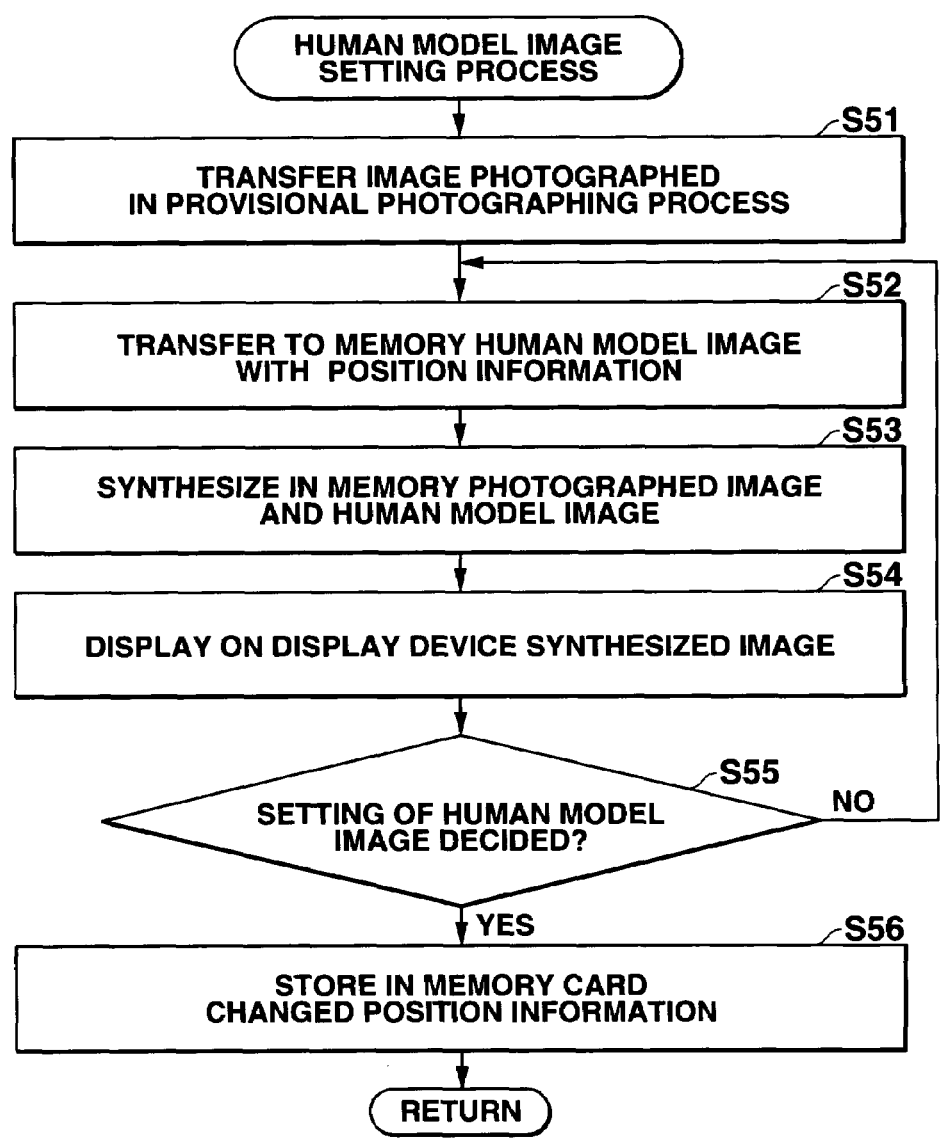
FIG. 5 is a flow chart showing procedures for a process of setting a human model image.

FIG. 5 is a flow chart showing procedures for the human model image setting process, and FIG. 6 is a view illustrating a sample of a modified human model image. In the human model image setting process shown in FIG. 5, data of the photographed image at the provisional photographing process (the subject image G2) is read out from the memory card 13, and transferred to the work area of the DRAM 10 at Step S51. Further, data of the human model image G1 is transferred to the work area of the DRAM 10 at Step S52, and the human model image G1 is synthesized with the photographed image (the subject image G2) at the work area of the DRAM 10 at Step S53. The synthesized image, i.e. the composition indicating image G4 (refer to FIG. 6) is displayed on the display device 6 at Step S54.

Then, the user is requested to make modification to the human model image G1 using the direction key and other key. More specifically, the user is requested to change the position and/or the size (enlarge or reduction) of the human model image in the subject image G2, or to rotate the human model image, or the user is requested to determine the setting conditions. When any modification is made at Step S55 (NO), the processes at Step S52 through S54 are repeatedly performed to reflect the modifications to the composition indicating image G4, and the modified composition indicating image G4 is displayed on the display device 6. (An example of the composition indicating image G4, in which the human model image is enlarged and moved is shown at the bottom in FIG. 6.)

When the user wants to keep his or her position decided at the provisional photographing process, for example, close to the camera, the user enlarges the human model image G1 in the subject image G2 and operates the decision key. On the contrary, when the user wants to keep his or her position away from the camera, then the user reduces the human model image G1 in the subject image G2 and operates the decision key.

When the decision key is operated at Step S55 (YES), position data of the human model image G1 and setting data including enlarging or reducing rate (when the size is changed) and/or an angle (when image is rotated) of the human model image G1 are stored in the memory card 13 at Step S56, and the human model image setting process terminates. A process similar to the human model image setting process may be performed between the processes at Step S32 through Step S34 before the shutter key is operated by the user in the provisional photographing process. The modification made by the user during the human model image setting process may be restricted to change in size (enlarge and reduction) and rotation of the human model image G1.

When he human model image setting process terminates, the DSP/CPU 3 returns to the operation of FIG. 2. Again, it is judged if any modification to the human model image G1 is requested, and when no modification is requested by the user at Step S4 (NO), the real photographing process is performed at Step S6.

Figure 7:
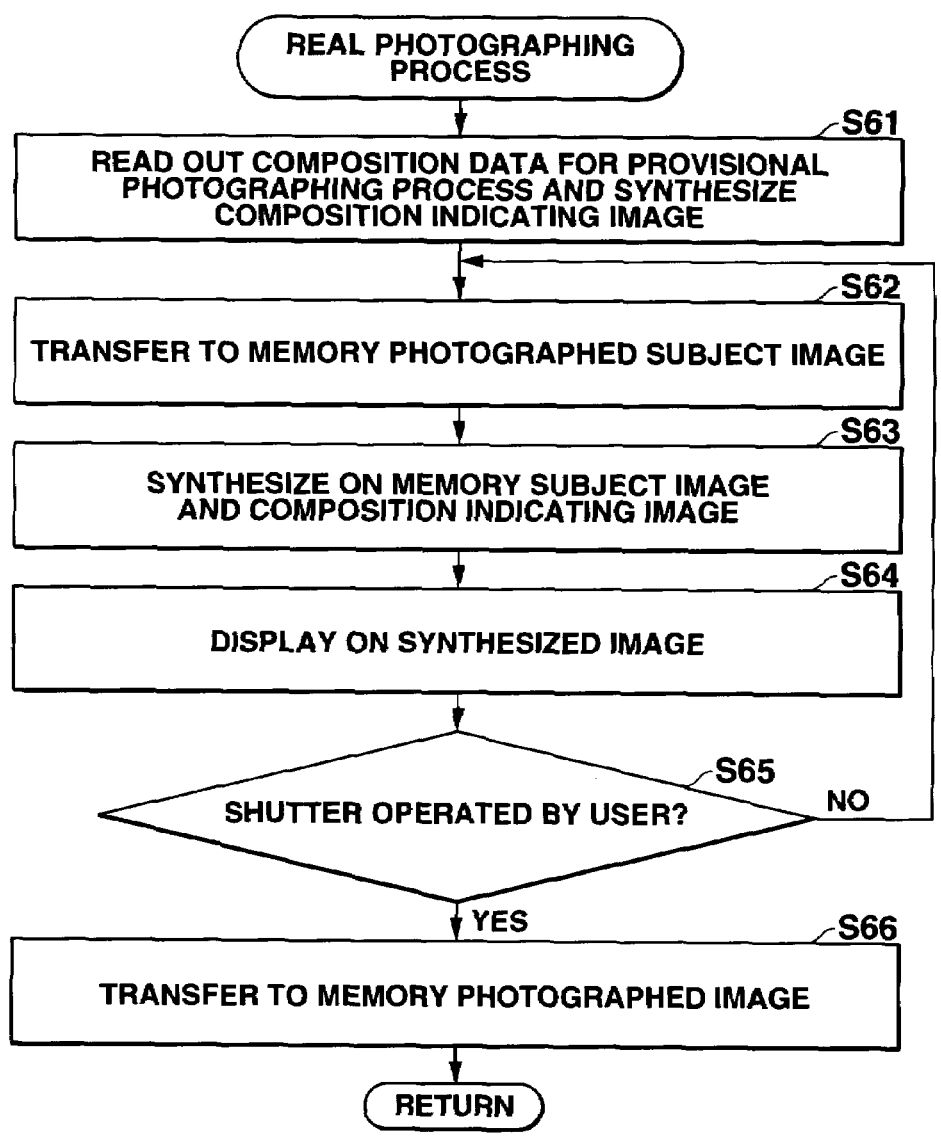
FIG. 7 is a flow chart showing procedures for a real photographing process.
Figure 8:
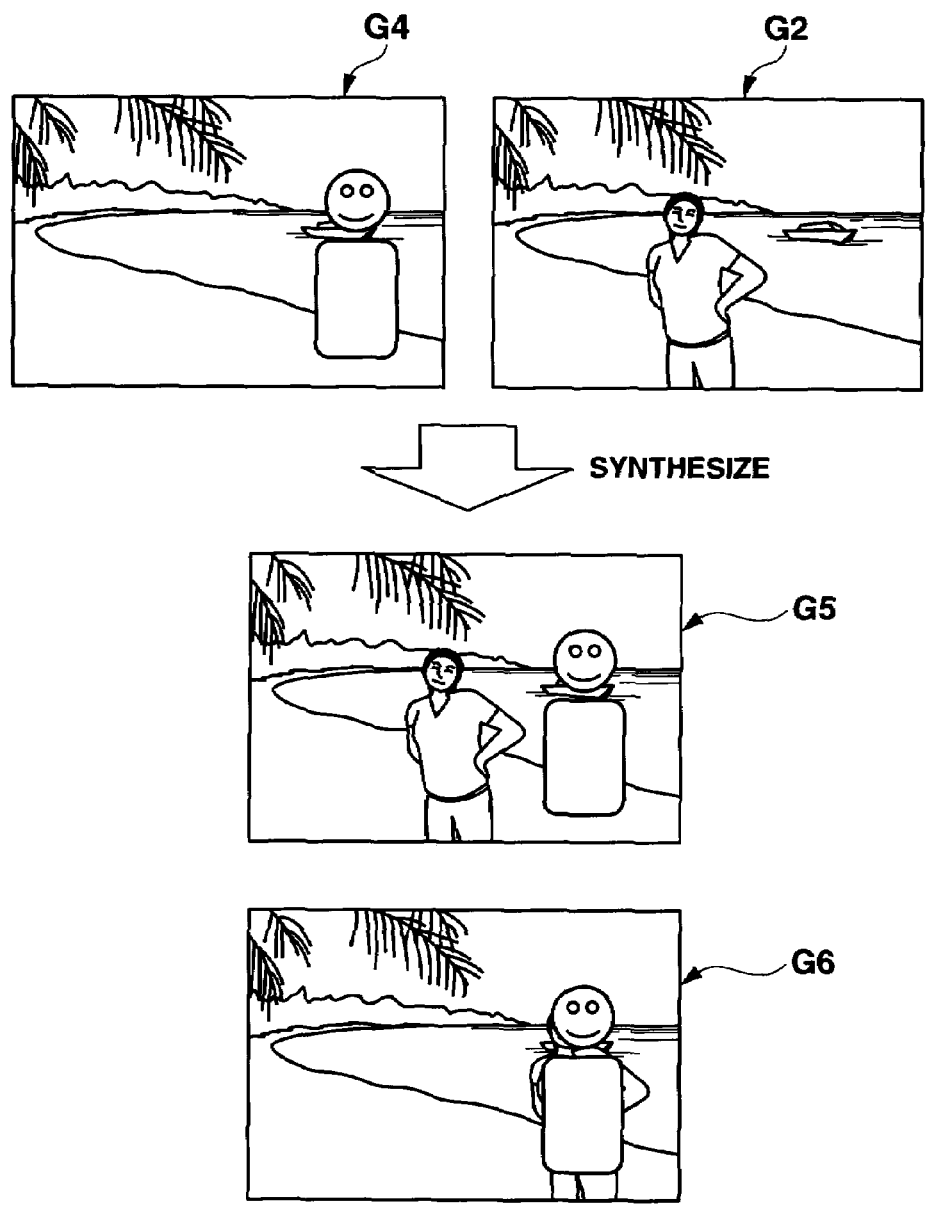
FIG. 8 is a view illustrating procedures for the real photographing process.

FIG. 7 is a flow chart showing procedures for the real photographing process, and FIG. 8 is a view illustrating procedures for the real photographing process.

In the real photographing process, the composition data stored in the memory card 13 in the provisional photographing process is read out, and composition indicating data G4 is synthesized at the work area of the DRAM 10 from the photographed data (the subject image G2) obtained in the provisional photographing process and the human model image G1 at Step S61.

Then, the subject image G2 obtained by the CCD 2 (refer to FIG. 8) is transferred to the DRAM 10 at Step S62 and the subject image G2 and the composition indicating data G4 are synthesized into synthesized data G5 at Step S63, and then the synthesized data G5 is displayed on the display device 6 at Step S64. In a synthesizing process at Step S63, the composition indicating data G4 is processed to be displayed in a semi transparent state, and the subject image G2 is processed to be displayed visible in the synthesized data G5. (FIG. 8 is a reference view, in which the composition indicating data G4 is not displayed in a semi transparent state.) Then the processes at Step S62 through Step S64 are repeatedly performed until the shutter key is operated by the user at Step S65. In a standby state before the shutter key is operated by the user, the synthesized image 5 is displayed on the display device 6, in which only the subject image G2 (a normal through image part) is moved within the displayed screen in response to a framing operation by the user.

The user hands to his or her friend or other (a photographer) the digital camera set in the above mention manner, asking to take a picture of him or her, and moves to the position previously determined. Then, the user asks the photographer to watch the synthesized image G5 displayed on the display device 6 and to hold the digital camera 1 to make a background of the subject image G2 or a normal through image coincide with the composition indicating image G4, and further asks the photographer to instruct the user (now, a main subject) to change the position such that an image of the user is in accord with the human model image G1 in the composition indicating image G4. (Refer to the synthesized image G6 in FIG. 8.), and to operate the shutter key at the time when the image of the user coincides with the human model image G1 in the composition indicating image G4. For example, the user asks the photographer to instruct him so as to change his position, saying "Move to the right", "Move a little to the left", and so on. When the photographer takes a picture of the user with the digital camera 1, automatic setting systems such as AF and AE of the camera work at the target of the human model image G1, bringing the user into focus.

When the shutter key of the digital camera 1 is operated at Step S65 (YES), the subject is finally photographed and data of the photographed image is obtained. Data of the photographed image is transferred to the DRAM 10 at Step S66, and the real photographing process terminates.

Then, the DSP/CPU 3 returns to the operation of FIG. 2, and the photographed image is compressed and stored in the memory card 13 at Step S7. The data of the photographed image (the subject image G2) which has been stored in the memory card 13 in the provisional photographing process, setting data concerning the human model image G1 including position data, and information of conditions for photographing the subject are deleted at Step S8.

As described above, the user can obtain his or her own picture of the whole composition the user intended, in which the user takes his or her intended position. Therefore, the user may be released from inconvenience which the user will meet when the user takes a picture of him or her. Further, since AF and AE system work at the target of the human model image (G1), it may be avoided to bring the background and/or other subject into focus, and a picture sharply focused on the subject or the user may be obtained.

As set forth above, the human model image may be changed in position and/or size in the composition indicating image G4, and therefore the user can precisely arrange his or her position in the intended composition. Further more, it may be possible to change the position and the size of the human model image even after the provisional photographing process has been performed, and therefore the user can arrange the composition of the picture without any pressure. More specifically, in the arranging work after the provisional photographing process has been performed, since the photographed image G2 included in the composition indicating image G4 and obtained in the provisional photographing process is fixedly displayed on the display device 6, the user is not required to hold the camera at a fixed position.

Meanwhile, when a process of "CREATE HUMAN MODEL" is selected at Step 2 (NO) after the pre photographing mode has been selected at Step S1 (YES), a human model image creating process is performed at Step S9.

Figure 9:
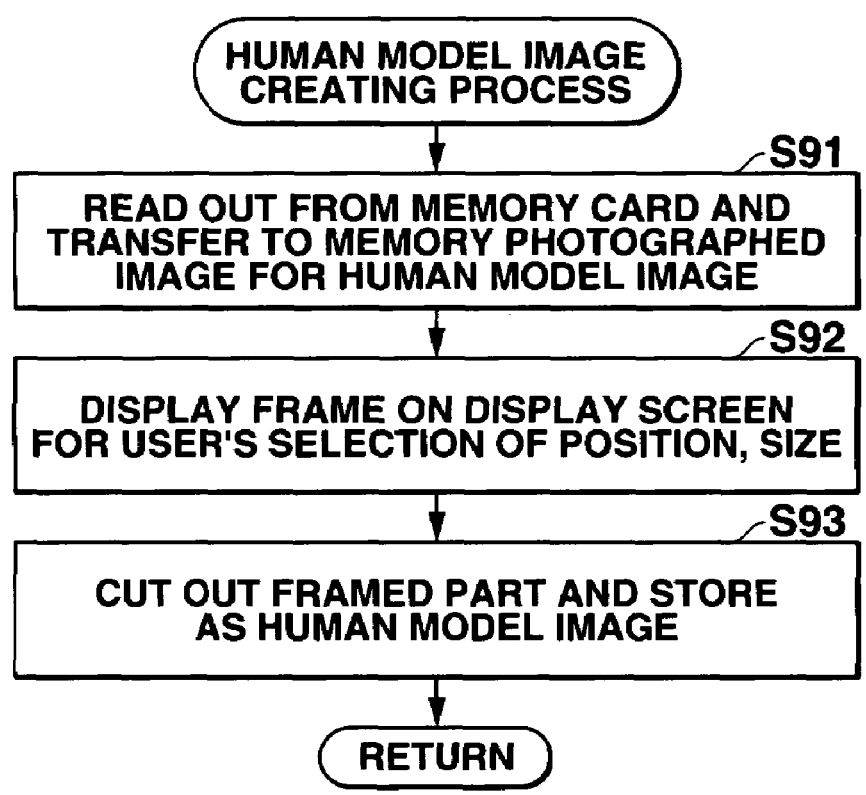
FIG. 9 is a flow chart showing procedures for a process of creating a human model image.

FIG. 9 is a flow chart showing procedures for the human model image creating; process, and FIG. 10 is a view illustrating procedures for the human model image creating process.

In the human model image creating process, a photographed image to be used as a human model image is selected from the photographed image stored in the memory card 13, and the selected photographed image is read out from the memory card 13 and transferred to the work area of the DRAM 10 and further displayed on the display device 6 at Step S91. A frame A (a rectangular frame in FIG. 10) is displayed on the display screen (photographed image G7) and a size and a position of the frame A on the display screen are decided by key operation of the user at Step S92. Then, a part of the image surrounded by the decided frame is cut out is stored in the built-in flash memory 11 as a new human model image at Step S93, finishing the process, and the DSP/CPU 3 returns to the operation of FIG. 2.

Figure 11:
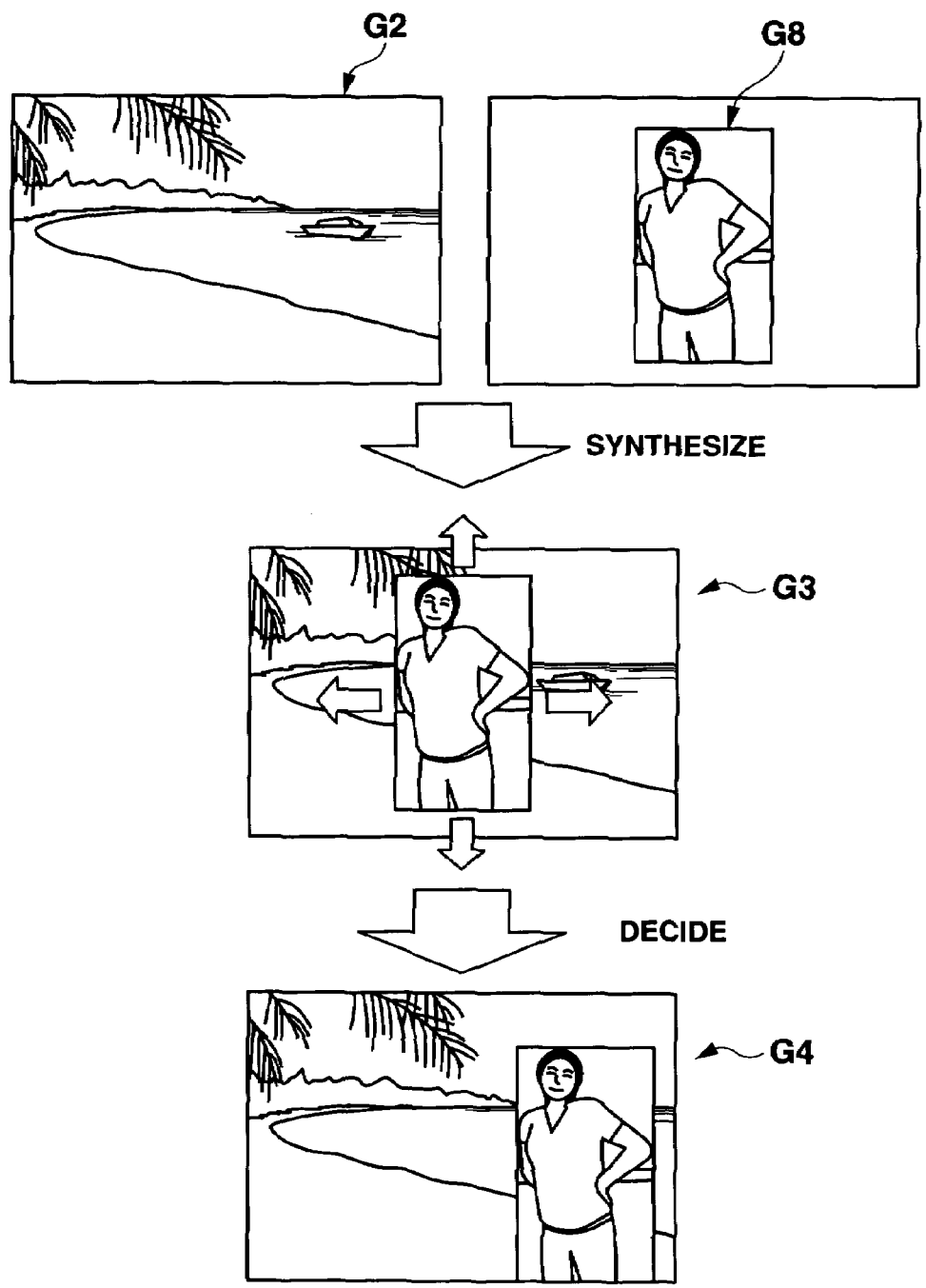
FIG. 11 is a view illustrating procedures for the provisional photographing process performed when a human model image is used, which is created in the process of creating a human model image.

As set forth above, a main subject included in the photographed image stored in the memory card 13 may be used as a human model image composing the composition indicating image G4. In other words, the image of the main subject may be used in the provisional photographing process in a similar manner to those stored in the built-in flash memory 11. The main subject included in the photographed image is used as the human model image as shown in FIG. 11, which corresponds to FIG. 4. The composition indicating image G4 may be arranged closed to an image of a picture that the user wants to finally keep. As a result, the human model image creating process will help the photographer who is asked to take a picture in the framing work at the real photographing process.

In the embodiment set forth above, the provisional photographing process and the real photographing process are performed as a series of operations, and the user asks the photographer to perform one real photographing process which corresponds to the provisional photographing process which has been performed by the user. But it is possible that the user previously performs the provisional photographing process for several times and stores several composition data relating to several composition indicating images G4, and then the user asks the photographer to continuously perform the real photographing process for several times each corresponding to the previously performed provisional photographing process. In this case, the user may ask the photographer to continuously take plural pictures of different compositions. In the embodiment, composition data relating to the composition indicating image is deleted each time after the real photographing process has been performed, but on the contrary the composition data may be stored and used for several times to take a picture of the same composition at another opportunity.

The user can arrange the position and size of the human model image G1 in the composition indicating image G4, but the following modifications will be convenient for the user. That is, the plural composition data for different positions and sizes are previously stored in the built-in flash memory 11, and in the provisional photographing process (FIG. 3), the user selects a pattern of preferable position and size of the human model image G1 on the composition indicating image G4 displayed on the display device 6, which image G4 includes the human model image G1 synthesized based on the previously stored composition data, and creates and stores composition data for the selected pattern for usage at another opportunity. In another modification, plural human model images G1 of a man, a woman, and a child are previously prepared and stored in the built-in flash memory 11, and it will be convenient for the user to select, in the provisional photographing process, one out of the plural human model images G1 previously stored in the built-in flash memory 11. Data of the human model image G1 may be stored in the memory card 11, too. The human model image G1 or an image used to determine a position in the composition indicating image G4 is not limited to a human model but an animal image and other figures such as a rectangle may be used.

In the embodiment of the invention, of the composition indicating image G4 may be synthesized on the memory from the photographed image (the subject image G2), the position information representing the position of the human model image G1 to be synthesized with the subject image G2, data including the enlarging or reducing rate, or angle of the human model image G1 to obtain the composition data, but the image data of the synthesized composition indicating image G4 may be stored as the composition data. But it is necessary to store separately the photographed image (the subject image G2) obtained in the provisional photographing process to allow to change the position of the human model image G1 to be synthesized with the subject image G2 or to modify the human model image G1. In the embodiment, these composition data are stored in the memory card 13 but may be stored in the built-in flash memory 11.

Further modification and variation can be made to the disclosed embodiment without departing from the subject and spirit of the invention as defined in the following claims. Such modification and variations, as included within the scope of these claims, are meant to be considered part of the invention as described.

What is claimed is:

1. A camera apparatus comprising:
    a photographing section for obtaining an image of a subject;
    a display section for displaying the image obtained by the photographing section in a standby state in a photographing mode;
    a storing section for storing the image obtained by the photographing section in response to photographing operation;
    an image synthesizing section for synthesizing: (i) an image representing composition of the image obtained by the photographing section and (ii) a position specifying image representing a predetermined position, to obtain a first synthesized image;
    a composition data storing section for storing composition data relating to a composition indicating image in which the position specifying image takes a position desired by a user in the first synthesized image; and a display control section for successively synthesizing the image obtained by the photographing section with the composition indicating image based on the composition data stored in the composition data storing section to make a second synthesized image, and for displaying, for recognition by a photographer, the second synthesized image on the display section in the standby state in the photographing mode.

2. The camera apparatus according to claim 1, further comprising:

a modification section for modifying the position specifying image in response to a predetermined operation.

3. The camera apparatus according to claim 2, wherein the modification section changes a size of the position specifying image.

4. The camera apparatus according to claim 1, wherein the position specifying image is a human model image representing a human body.

5. The camera apparatus according to claim 1, wherein the display control section synthesizes the image obtained by the photographing section with the composition indicating image such that the composition indicating image is semi-transparent, so as to allow the photographer to recognize the composition indicating image in the standby state in the photographing mode.

6. The camera apparatus according to claim 1, further comprising:

a position changing section for changing a position of the position specifying image in the composition indicating image in response to predetermined operation.

7. The camera apparatus according to claim 1, further comprising:

a cutting out section for cutting out a part specified in the image stored in the storing section; and a partial image storing section for storing the part of the image cut out by the cutting out section.

8. The camera apparatus according to claim 7, wherein the position specifying image comprises the part of the image stored in the partial image storing section.

9. The camera apparatus according to claim 7, wherein the part of the image is a human model image.

10. The camera apparatus according to claim 7, further comprising:

a position changing section for changing a position of the part of the image in the composition indicating image in response to predetermined operation.

* * * * *